US009462537B2

(12) United States Patent
Yang et al.

(10) Patent No.: US 9,462,537 B2
(45) Date of Patent: Oct. 4, 2016

(54) NETWORK ACCESS POINT, NETWORK CONTROLLER, NETWORK DEVICE, AND LOAD CONTROL METHOD THEREOF

(71) Applicant: Huawei Technologies Co., Ltd., Shenzhen, Guangdong (CN)

(72) Inventors: Jianjun Yang, Chengdu (CN); Xuehuan Wang, Chengdu (CN); Shunyu Wang, Chengdu (CN); Jie Sun, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 45 days.

(21) Appl. No.: 14/511,282

(22) Filed: Oct. 10, 2014

(65) Prior Publication Data

US 2015/0094110 A1 Apr. 2, 2015

Related U.S. Application Data

(63) Continuation of application No. PCT/CN2013/089708, filed on Dec. 17, 2013.

(30) Foreign Application Priority Data

Sep. 27, 2013 (CN) .......................... 2013 1 0452230

(51) Int. Cl.
*H04B 7/00* (2006.01)
*H04W 48/06* (2009.01)

(52) U.S. Cl.
CPC .................................. *H04W 48/06* (2013.01)

(58) Field of Classification Search
CPC ...... H04L 45/00; H04L 45/60; H04L 1/0002; H04L 1/0017; H04L 41/12; H04L 47/829; H04W 48/16; H04W 64/003; H04W 72/0486; H04W 72/085; H04W 74/0866; H04W 84/045; H04W 84/12
USPC ................ 455/509, 3.01, 3.05, 426.2, 435.2; 370/230, 231, 252, 329, 338, 401
See application file for complete search history.

(56) References Cited

FOREIGN PATENT DOCUMENTS

| CN | 101959282 A | 1/2011 |
| CN | 102802202 A | 11/2012 |
| CN | 103002542 A | 3/2013 |
| WO | WO 2004004278 A1 | 1/2004 |
| WO | WO 2006075937 A1 | 7/2006 |

*Primary Examiner* — Shaima Q Aminzay
(74) *Attorney, Agent, or Firm* — Leydig, Voit & Mayer, Ltd.

(57) ABSTRACT

The present invention provides a network access point, a network controller, a network device, and a load control method thereof. The load control method includes: setting, by a network device, an access condition for accessing a first network by a terminal; receiving, by the network device, a first signal from the terminal, and obtaining a measurement parameter of the terminal according to the first signal; and if the measurement parameter of the terminal satisfies the access condition, sending, by the network device, a second signal to the terminal, so as to allow the terminal to access the first network, wherein the measurement parameter is a signal strength of the terminal and/or a terminal distance of the terminal. By using the foregoing manner, the present invention can improve spectral efficiency of a network access point.

20 Claims, 11 Drawing Sheets

NETWORK ACCESS POINT, NETWORK CONTROLLER, NETWORK DEVICE, AND LOAD CONTROL METHOD THEREOF

CROSS-REFERENCE TO RELATED APPLICATIONS

This application is a continuation of International Patent Application No. PCT/CN2013/089708, filed on Dec. 17, 2013, which claims priority to Chinese Patent Application No. 201310452230.7, filed on Sep. 27, 2013, both of which are hereby incorporated by reference in their entireties.

TECHNICAL FIELD

The present invention relates to the field of communications technologies, and in particular, to a network access point, a network controller, a network device, and a load control method thereof.

BACKGROUND OF THE INVENTION

At present, wireless local area networks (WLANs) such as WiFi (Wireless Fidelity) networks, which are seen as a simple and inexpensive wireless access technology, have been widely deployed as a supplement to cellular networks to alleviate data service load on the cellular networks, and have become popular among users. However, a limited capability of access control by WiFi networks introduces a high likelihood of non-guaranteed communication quality between the WiFi networks and access terminals.

In the prior art, a maximum load of a network access point on WiFi networks is introduced to address the challenge in guaranteeing communication quality between WiFi networks and access terminals. Specifically, a terminal is allowed to access a WiFi network through a network access point only when a current load of the network access point is less than the maximum load and an access request signal carrying a first signal of the terminal can be correctly demodulated. When the current load is less than the maximum load, an access request signal sent by a terminal distant from the network access point can also be correctly demodulated. In this case, a communication rate of the terminal is very low, which introduces a high probability of a reduction in spectral efficiency of the whole network access point.

SUMMARY

Embodiments of the present invention provide a network access point, a network controller, a network device, and a load control method thereof, so as to improve spectral efficiency of a first network.

A first aspect provides a load control method of a network device, including: setting, by a network device, an access condition for accessing a first network by a terminal; receiving, by the network device, a first signal from the terminal, and obtaining a measurement parameter of the terminal according to the first signal, where the measurement parameter is a signal strength of the terminal and/or a terminal distance of the terminal, and the terminal distance is a distance between the terminal and the first network; and if the measurement parameter satisfies the access condition, sending, by the network device, a second signal to the terminal, so as to allow the terminal to access the first network, where that the measurement parameter of the terminal satisfies the access condition includes that the measurement parameter is greater than or equal to a preset measurement parameter threshold, a fluctuation of the measurement parameter is less than or equal to a preset fluctuation threshold of the measurement parameter, or a frequency of fluctuation in the measurement parameter is less than or equal to a preset frequency of fluctuation in the measurement parameter.

With reference to the implementation of the first aspect, in a first possible implementation, the load control method further includes: if the measurement parameter of the terminal does not satisfy the access condition, not sending, by the network device, a second signal to the terminal, so as to deny access of the terminal to the first network; or if the measurement parameter of the terminal does not satisfy the access condition, sending, by the network device, a second signal to the terminal, so as to deny access of the terminal to the first network, where that the measurement parameter of the terminal does not satisfy the access condition includes that the measurement parameter is less than the preset measurement parameter threshold, the fluctuation of the measurement parameter is greater than the preset fluctuation threshold of the measurement parameter fluctuation, or the frequency of fluctuation in the measurement parameter is greater than the preset frequency of fluctuation in the measurement parameter.

With reference to the implementation of the first aspect, in a second possible implementation, the network device includes a network access point and a first network controller of the first network, and the step of setting, by a network device, an access condition for accessing a first network by a terminal includes: obtaining, by the network access point, a load of the network access point of the first network, and setting the access condition according to the load, so as to compare the measurement parameter of the terminal with the access condition; or obtaining, by the first network controller, a load of the network access point of the first network, and setting the access condition according to the load, sending, by the first network controller, the access condition to the network access point, and comparing, by the network access point, the measurement parameter of the terminal with the access condition; or obtaining, by the first network controller, a load of the network access point of the first network, setting the access condition according to the load, and comparing the measurement parameter of the terminal with the access condition.

With reference to the second possible implementation of the first aspect, in a third possible implementation, the step of receiving, by the network device, a first signal from the terminal, and obtaining a measurement parameter of the terminal according to the first signal includes: receiving, by the network access point, the first signal from the terminal, and obtaining the measurement parameter of the terminal according to the first signal, and comparing, by the network access point, the measurement parameter with the access condition; or receiving, by the network access point, the first signal from the terminal, and obtaining the measurement parameter of the terminal according to the first signal, and sending, by the network access point, the measurement parameter to the first network controller, so that the first network controller compares the measurement parameter with the access condition; or receiving, by the first network controller, the first signal from the terminal, and obtaining the measurement parameter of the terminal according to the first signal, and comparing, by the first network controller, the measurement parameter with the access condition.

With reference to the second possible implementation of the first aspect, in a fourth possible implementation, the step of if the measurement parameter of the terminal satisfies the access condition, sending, by the network device, a second signal to the terminal, so as to allow the terminal to access the first network includes: if the network access point determines, by comparison, that the measurement parameter of the terminal satisfies the access condition, sending, by the network access point, the second signal to the terminal, so as to allow the terminal to access the first network; or if the network access point determines, by comparison, that the measurement parameter of the terminal satisfies the access condition, sending, by the network access point, a load of the first network to the first network controller, and sending, by the first network controller, the second signal to the terminal according to load balancing of the first network and through the network access point, so as to allow the terminal to access the first network; or if the first network controller determines, by comparison, that the measurement parameter of the terminal satisfies the access condition, sending, by the first network controller, the second signal to the terminal according to load balancing of the first network, so as to allow the terminal to access the first network, where the load balancing means that the first network controller allows the terminal to access the first network through a network access point which has a minimum load among a plurality of network access points of the first network.

With reference to the second possible implementation of the first aspect, in a fifth possible implementation, the network access point includes a first network access point and a second network access point, where the step of setting, by the network access point, the access condition according to the load of the network access point of the first network includes: setting, by the first network access point, a first access condition according to a load of the first network access point, and sending the first access condition to the first network controller, setting, by the second network access point, a second access condition according to a load of the second network access point, and sending the second access condition to the first network controller, and updating, by the first network controller, the first access condition and the second access condition according to the load of the first network access point and the load of the second network access point; or the step of obtaining, by the first network controller, a load of the network access point of the first network, and setting the access condition according to the load includes: obtaining, by the first network controller, a load of the first network access point and a load of the second network access point, setting, by the first network controller, a first access condition according to the load of the first network access point, and setting a second access condition according to the load of the second network access point, and further updating, by the first network controller, the first access condition and the second access condition according to the load of the first network access point and the load of the second network access point.

With reference to the second possible implementation of the first aspect, in a sixth possible implementation, the first network and a second network have a topological relationship, and the network device includes a second network controller, where the second network controller obtains a load of the second network, and obtains the load of the network access point of the first network through the first network controller, and the second network controller updates the access condition according to the topological relationship, the load of the second network, and the load of the network access point; or the first network controller obtains a load of the second network and the load of the network access point of the first network, and the first network controller updates the access condition according to the topological relationship, the load of the second network, and the load of the network access point.

With reference to the sixth possible implementation of the first aspect, in a seventh possible implementation, the access condition is updated according to the following formula: access condition=adjustment step*(reference load−load of the second network), where the reference load is a preset rated load of the second network.

With reference to the sixth possible implementation of the first aspect, in an eighth possible implementation, the second network is a cellular network covering the first network, and the second network controller is a radio network controller RNC, an evolved NodeB, eNB, a base station controller BSC, or a signaling gateway SGW.

With reference to the second possible implementation of the first aspect, in a ninth possible implementation, the step of setting, by the network access point, the access condition according to the load of the network access point of the first network further includes: determining, by the network access point, whether the first signal obtained from the terminal carries a user class; and if the first signal carries the user class, setting, by the network access point, the access condition according to the load of the network access point and the user class; or if the first signal does not carry the user class, querying, by the network access point, for the user class of the terminal from the first network controller, and setting the access condition according to the load of the network access point and the user class; or the step of obtaining, by the first network controller, a load of the network access point of the first network, and setting the access condition according to the load further includes: determining, by the first network controller, whether the first signal obtained from the terminal carries a user class; and if the first signal carries the user class, setting, by the first network controller, the access condition according to the load of the network access point and the user class; or if the first signal does not carry the user class, querying, by the first network controller, for the user class of the terminal, and setting the access condition according to the load of the network access point and the user class.

With reference to the ninth possible implementation of the first aspect, in a tenth possible implementation, the access condition is set according to the following formula: access condition=adjustment step*(user class−lowest user class), where the lowest user class is a preset lowest user class at which access to the first network is allowed.

With reference to the second possible implementation of the first aspect, in an eleventh possible implementation, the step of obtaining, by the first network controller, a load of the network access point of the first network, and setting the access condition according to the load further includes: forming, by the first network controller, a to-be-disconnected terminal list according to a terminal whose measurement parameter is less than or equal to a preset disconnection threshold, and sending the to-be-disconnected terminal list to the network access point; and performing, by the network access point, a disconnecting operation according to the to-be-disconnected terminal list; or performing, by the network access point, a disconnecting operation according to a terminal whose measurement parameter is less than or equal to a preset disconnection threshold.

With reference to the eleventh possible implementation of the first aspect, in a twelfth possible implementation, the disconnection threshold is equal to a difference between an access threshold of the access condition and a preset fixed value.

With reference to the second possible implementation of the first aspect, in a thirteenth possible implementation, the first network is a wireless local area network, and the first network controller is an access point controller AC.

A second aspect provides a network access point, which is applied in a network device, where the network access point includes a second receiving unit, a second processing unit, and a second sending unit; the second receiving unit is configured to receive a first signal from a terminal, the second processing unit is configured to set an access condition for accessing a first network by the terminal, and obtain a measurement parameter of the terminal according to the first signal, so as to determine whether the measurement parameter satisfies the access condition, and if the measurement parameter satisfies the access condition, the second sending unit is configured to send a second signal to the terminal, so as to allow the terminal to access the first network, where the measurement parameter is a signal strength of the terminal and/or a terminal distance of the terminal, the terminal distance is a distance between the terminal and the first network, and that the measurement parameter of the terminal satisfies the access condition includes that the measurement parameter is greater than or equal to a preset measurement parameter threshold, a fluctuation of the measurement parameter is less than or equal to a preset fluctuation threshold of the measurement parameter, or a frequency of fluctuation in the measurement parameter is less than or equal to a preset frequency of fluctuation in the measurement parameter.

With reference to the implementation of the second aspect, in a first possible implementation, if the second processing unit determines that the measurement parameter of the terminal does not satisfy the access condition, the second sending unit does not send a second signal to the terminal, so as to deny access of the terminal to the first network; or if the second processing unit determines that the measurement parameter of the terminal does not satisfy the access condition, the second sending unit is configured to send a second signal to the terminal, so as to deny access of the terminal to the first network, where that the measurement parameter of the terminal does not satisfy the access condition includes that the measurement parameter is less than the preset measurement parameter threshold, the fluctuation of the measurement parameter is greater than the preset fluctuation threshold of the measurement parameter, or the frequency of fluctuation in the measurement parameter is greater than the preset frequency of fluctuation in the measurement parameter.

With reference to the implementation of the second aspect, in a second possible implementation, the network device further includes a first network controller, and the second processing unit is further configured to set the access condition according to a load of the first network, and compare the measurement parameter of the terminal with the access condition; or the second receiving unit is further configured to receive the access condition which is set according to a load of the first network sent by the first network controller, and compare the measurement parameter of the terminal with the access condition.

With reference to the second possible implementation of the second aspect, in a third possible implementation, the second receiving unit is configured to receive the first signal from the terminal, and the second processing unit is configured to obtain the measurement parameter of the terminal according to the first signal, and compare the measurement parameter with the access condition; or the second receiving unit is configured to receive the first signal from the terminal, the second processing unit is configured to obtain the measurement parameter of the terminal according to the first signal, and the second sending unit is configured to send the measurement parameter to the first network controller, so that the first network controller compares the measurement parameter with the access condition.

With reference to the second possible implementation of the second aspect, in a fourth possible implementation, if the second processing unit determines, by comparison, that the measurement parameter of the terminal satisfies the access condition, the second sending unit is configured to send the second signal to the terminal, so as to allow the terminal to access the first network; or if the second processing unit determines, by comparison, that the measurement parameter of the terminal satisfies the access condition, the second sending unit is configured to send the load of the first network to the first network controller, so that the first network controller sends the second signal to the terminal according to load balancing of the first network and through the second sending unit, so as to allow the terminal to access the first network, where the load balancing means that the first network controller allows the terminal to access the first network through a network access point which has a minimum load among a plurality of network access points of the first network.

With reference to the second possible implementation of the second aspect, in a fifth possible implementation, the network access point includes a first network access point and a second network access point, the first network access point includes a third processing unit and a third sending unit, and the second network access point includes a fourth processing unit and a fourth sending unit, where the third processing unit is configured to set a first access condition according to a load of the first network access point, the third sending unit is configured to send the first access condition to the first network controller, the fourth processing unit is configured to set a second access condition according to a load of the second network access point, and the fourth sending unit is configured to send the second access condition to the first network controller, so that the first network controller updates the first access condition and the second access condition according to the load of the first network access point and the load of the second network access point.

With reference to the second possible implementation of the second aspect, in a sixth possible implementation, the second processing unit is further configured to determine whether the first signal obtained from the terminal carries a user class, and if it is determined that the first signal carries the user class, the second processing unit is configured to set the access condition according to a load of the network access point and the user class; or if the first signal does not carry the user class, the second processing unit is configured to query for the user class of the terminal from the first network controller, and set the access condition according to a load of the network access point and the user class.

With reference to the sixth possible implementation of the second aspect, in a seventh possible implementation, the second processing unit is configured to set the access condition according to the following formula:

$$\text{access condition} = \text{adjustment step} * (\text{user class} - \text{lowest user class}), \text{ where}$$

the lowest user class is a preset lowest user class at which access to the first network is allowed.

With reference to the second possible implementation of the second aspect, in an eighth possible implementation, the second receiving unit is configured to receive a to-bedisconnected terminal list, which is formed by the first network controller according to a terminal whose measurement parameter is less than or equal to a preset disconnection threshold, and the second processing unit is configured to perform a disconnecting operation according to the to-be-disconnected terminal list; or the second processing unit is configured to perform a disconnecting operation according to a terminal whose measurement parameter is less than or equal to a preset disconnection threshold.

With reference to the eighth possible implementation of the second aspect, in a ninth possible implementation, the disconnection threshold is equal to a difference between an access threshold of the access condition and a preset fixed value.

With reference to the second possible implementation of the second aspect, in a tenth possible implementation, the first network is a wireless local area network, and the first network controller is an access point controller AC.

A third aspect provides a first network controller, which is applied in a network device, where the first network controller includes a first receiving unit, a first processing unit, and a first sending unit; the first receiving unit is configured to receive a first signal from a terminal, the first processing unit is configured to set an access condition for accessing a first network by the terminal, and obtain a measurement parameter of the terminal according to the first signal, so as to determine whether the measurement parameter satisfies the access condition, and if the measurement parameter satisfies the access condition, the first sending unit is configured to send a second signal to the terminal, so as to allow the terminal to access the first network, where the measurement parameter is a signal strength of the terminal and/or a terminal distance of the terminal, the terminal distance is a distance between the terminal and the first network, and that the measurement parameter of the terminal satisfies the access condition includes that the measurement parameter is greater than or equal to a preset measurement parameter threshold, a fluctuation of the measurement parameter is less than or equal to a preset fluctuation threshold of the measurement parameter, or a frequency of fluctuation in the measurement parameter is less than or equal to a preset frequency of fluctuation in the measurement parameter.

With reference to the implementation of the third aspect, in a first possible implementation, if the first processing unit determines that the measurement parameter of the terminal does not satisfy the access condition, the first sending unit does not send a second signal to the terminal, so as to deny access of the terminal to the first network; or if the first processing unit determines that the measurement parameter of the terminal does not satisfy the access condition, the first sending unit is configured to send a second signal to the terminal, so as to deny access of the terminal to the first network, where that the measurement parameter of the terminal does not satisfy the access condition includes that the measurement parameter is less than the preset measurement parameter threshold, the fluctuation of the measurement parameter is greater than the preset fluctuation threshold of the measurement parameter, or the frequency of fluctuation in the measurement parameter is greater than the preset frequency of fluctuation in the measurement parameter.

With reference to the implementation of the third aspect, in a second possible implementation, the network device further includes a network access point; the first receiving unit is configured to obtain a load of the network access point of the first network, the first processing unit is configured to set the access condition according to the load, and the first sending unit is configured to send the access condition to the network access point, so that the network access point compares the measurement parameter of the terminal with the access condition; or the first receiving unit is configured to obtain a load of the network access point of the first network, and the first processing unit is configured to set the access condition according to the load, and compare the measurement parameter of the terminal with the access condition.

With reference to the second possible implementation of the third aspect, in a third possible implementation, the first receiving unit is configured to receive the measurement parameter which is obtained by the network access point according to the first signal received from the terminal, and the first processing unit is configured to compare the measurement parameter with the access condition; or the first receiving unit is configured to receive the first signal from the terminal, and the first processing unit is configured to obtain the measurement parameter of the terminal according to the first signal, and compare the measurement parameter with the access condition.

With reference to the second possible implementation of the third aspect, in a fourth possible implementation, the first receiving unit is configured to receive a load of the first network which is sent by the network access point when determining, by comparison, that the measurement parameter of the terminal satisfies the access condition, and the first processing unit is configured to send the second signal to the terminal according to load balancing of the first network and through the network access point, so as to allow the terminal to access the first network; or if the first processing unit is configured to determine, by comparison, that the measurement parameter of the terminal satisfies the access condition, the first processing unit instructs, according to load balancing of the first network, the first sending unit to send the second signal to the terminal, so as to allow the terminal to access the first network, where the load balancing means that the first network controller allows the terminal to access the first network through a network access point which has a minimum load among a plurality of network access points of the first network.

With reference to the second possible implementation of the third aspect, in a fifth possible implementation, the network access point includes a first network access point and a second network access point, where the first receiving unit is configured to receive a first access condition which is set by the first network access point according to a load of the first network access point, and a second access condition which is set by the second network access point according to a load of the second network access point, and the first processing unit is configured to update the first access condition and the second access condition according to the load of the first network access point and the load of the second network access point; or the first processing unit is configured to set a first access condition according to a load of the first network access point, and set a second access condition according to a load of the second network access point, and the first processing unit is further configured to update the first access condition and the second access condition according to the load of the first network access point and the load of the second network access point.

With reference to the second possible implementation of the third aspect, in a sixth possible implementation, the first network and a second network have a topological relationship, the network device includes a second network controller, and the second network controller includes a fifth receiving unit and a fifth processing unit, where the fifth receiving unit is configured to obtain a load of the second network, the first receiving unit is configured to obtain the load of the network access point of the first network, and the fifth processing unit is configured to update the access condition according to the topological relationship, the load of the second network, and the load of the network access point; or the first receiving unit is configured to obtain a load of the second network and the load of the network access point of the first network, and the first processing unit is configured to update the access condition according to the topological relationship, the load of the second network, and the load of the network access point.

With reference to the sixth possible implementation of the third aspect, in a seventh possible implementation, the first processing unit or the fifth processing unit is configured to update the access condition according to the following formula:

access condition=adjustment step*(reference load−load of the second network), where the reference load is a rated load, which is preset by the fifth processing unit, of the second network.

With reference to the sixth possible implementation of the third aspect, in an eighth possible implementation, the second network is a cellular network covering the first network, and the second network controller is a radio network controller RNC, an evolved NodeB, eNB, a base station controller BSC, or a signaling gateway SGW.

With reference to the second possible implementation of the third aspect, in a ninth possible implementation, the first processing unit is configured to determine whether the first signal obtained from the terminal carries a user class, and if it is determined that the first signal carries the user class, the first processing unit is configured to set the access condition according to the load of the network access point and the user class; or if the first processing unit is configured to determine that the first signal does not carry the user class, the first processing unit is configured to query for the user class of the terminal, and set the access condition according to the load of the network access point and the user class.

With reference to the ninth possible implementation of the third aspect, in a tenth possible implementation, the first processing unit is configured to set the access condition according to the following formula:

access condition=adjustment step*
(user class−lowest user class), where the lowest user class is a lowest user class which is preset by the first processing unit and at which access to the first network is allowed.

With reference to the second possible implementation of the third aspect, in an eleventh possible implementation, the first processing unit is configured to create a to-be-disconnected terminal list according to a terminal whose measurement parameter is less than or equal to a preset disconnection threshold, and the first sending unit is configured to send the to-be-disconnected terminal list to the network access point, so that the network access point performs a disconnecting operation according to the to-be-disconnected terminal list.

With reference to the eleventh possible implementation of the third aspect, in a twelfth possible implementation, the disconnection threshold is equal to a difference between an access threshold of the access condition and a preset fixed value.

With reference to the second possible implementation of the third aspect, in a thirteenth possible implementation, the first network is a wireless local area network, and the first network controller is an access point controller AC.

A fourth aspect provides a load control method, including: sending, by a terminal, a first signal to a network device, so that the network device obtains a measurement parameter according to the first signal, and the network device sets an access condition of the first network, where the measurement parameter is a signal strength of the terminal and/or a terminal distance of the terminal, and the terminal distance is a distance between the terminal and the first network; and receiving, by the terminal, a second signal sent by the network device, and when the measurement parameter satisfies the access condition, accessing the first network according to the second signal, where that the measurement parameter of the terminal satisfies the access condition includes that the measurement parameter is greater than or equal to a preset measurement parameter threshold, a fluctuation of the measurement parameter is less than or equal to a preset fluctuation threshold of the measurement parameter, or a frequency of fluctuation in the measurement parameter is less than or equal to a preset frequency of fluctuation in the measurement parameter.

With reference to the implementation of the fourth aspect, in a first possible implementation, the first network is a wireless local area network.

A fifth aspect provides a user equipment, including: a terminal receiving unit and a terminal sending unit; the terminal sending unit is configured to send a first signal to a network device, so that the network device obtains a measurement parameter according to the first signal, and the network device sets an access condition of a first network, and the terminal receiving unit is configured to: when the measurement parameter satisfies the access condition, receive a second signal sent by the network device, and access the first network according to the second signal, where the measurement parameter is a signal strength of the terminal and/or a terminal distance of the terminal, the terminal distance is a distance between the terminal and the first network, and that the measurement parameter of the terminal satisfies the access condition includes that the measurement parameter is greater than or equal to a preset measurement parameter threshold, a fluctuation of the measurement parameter is less than or equal to a preset fluctuation threshold of the measurement parameter, or a frequency of fluctuation in the measurement parameter is less than or equal to a preset frequency of fluctuation in the measurement parameter.

With reference to the implementation of the fifth aspect, in a first possible implementation, the first network is a wireless local area network.

By using the foregoing solutions, a beneficial effect of the present invention is that: in the present invention, a first signal sent by a to-be-connected terminal is received, and a corresponding measurement parameter is obtained according to the first signal, so as to compare the measurement parameter with an access condition, and when the measurement parameter satisfies the access condition, a second signal is sent, so as to allow access of the terminal, thereby improving spectral efficiency of a first network.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

Figure 1:
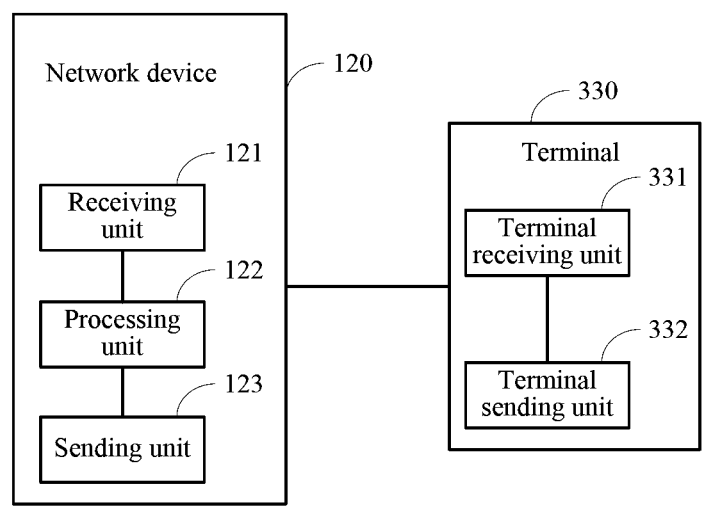
FIG. 1 is a principle block diagram of a network device and a terminal according to a first embodiment of the present invention.

The present invention provides a network device. As shown in FIG. 1, the network device 120 disclosed in this embodiment includes a receiving unit 121, a processing unit 122, and a sending unit 123. The network device 120 of this embodiment is configured to establish a network connection to a terminal 330. The network includes a first network, and the terminal 330 includes a terminal receiving unit 331 and a terminal sending unit 332.

The terminal sending unit 332 sends a first signal for requesting access; the receiving unit 121 obtains the first signal and obtains a load of the first network; the processing unit 122 sets an access condition according to the load, obtains a measurement parameter of the terminal 330 according to the first signal, and compares the measurement parameter with the access condition. If the measurement parameter satisfies the access condition, the sending unit 123 sends a second signal to the terminal 330; the terminal receiving unit 331 receives the second signal, and the terminal 330 accesses the first network according to the second signal, thereby establishing a network connection. The first network is a wireless local area network, and is preferably a WiFi network in this embodiment.

In this embodiment, the measurement parameter obtained by the terminal 330 may be a signal strength (RSSI, Received Signal Strength Indicator) obtained by parsing the first signal of the terminal 330, or may be a distance, namely, a terminal device, which is obtained by using a positioning method such as GPRS positioning, between the terminal 330 and the network device 120, or may include both, and apparently may be any other terminal information which can achieve the objective of the present invention. For example, the measurement parameter may be set as an SNR (Signal-to-Noise, signal-to-noise ratio), an SINR (Signal to Interference plus Noise Ratio, signal to interference plus noise ratio), RSRP (Reference Signal Receiving Power, reference signal receiving power), or RSRQ (Reference Signal Receiving Quality, reference signal receiving quality).

In this embodiment, because the measurement parameter is a signal strength of the terminal 330 and/or a terminal distance of the terminal 330, correspondingly, that the measurement parameter of the terminal 330 satisfies the access condition includes that the measurement parameter is greater than or equal to a preset measurement parameter threshold, a fluctuation of the measurement parameter is less than or equal to a preset fluctuation threshold of the measurement parameter, or a frequency of fluctuation in the measurement parameter is less than or equal to a preset frequency of fluctuation in the measurement parameter. That the measurement parameter of the terminal 330 does not satisfy the access condition includes that the measurement parameter is less than the preset measurement parameter threshold, the fluctuation of the measurement parameter is greater than the preset fluctuation threshold of the measurement parameter, or the frequency of fluctuation in the measurement parameter is greater than the preset frequency of fluctuation in the measurement parameter.

The fluctuation of the measurement parameter indicates an average value of differences among a plurality of sampled measurement parameters of the terminal 330; for example, among three samples, differences between every two adjacent samples are 10 and 8, and then the average value is 9. The preset measurement parameter threshold indicates a preset threshold for accessing the first network by the terminal 330, and the preset threshold is either a fixed value or fixed value range; if the preset fluctuation threshold of the measurement parameter is 7 and the fluctuation of the measurement parameter is 9, the fluctuation of the measurement parameter of the terminal 330 is greater than the preset fluctuation threshold of the measurement parameter, that is, the access condition is not satisfied.

The frequency of fluctuation in the measurement parameter indicates an averaged frequency of change in a plurality of sampled measurement parameters of the terminal 330; for example, among five samples, differences between every two adjacent samples are 1, 5, 15, and 5, and then the average frequency of change is $((5-1)+(15-5)+(5-15))\div 3=2$. The preset frequency of fluctuation in the measurement parameter indicates a preset fixed value or a fixed value range for the maximum frequency of change which must not be exceeded if the terminal 330 needs to access the first network; if the value range is 1 to 3 and the frequency of fluctuation in the measurement parameter is 2, the frequency of fluctuation in the measurement parameter falls within the preset value range, that is, the access condition is satisfied.

It should be noted that the fluctuation of the measurement parameter and the frequency of fluctuation in the measurement parameter which are included in the access condition of the present invention are only used as examples in the foregoing descriptions, and the present invention is not limited thereto.

In this embodiment, the second signal is preferably a frame signal similar to a probe response frame in the prior art, and in other examples, the first signal sent by the terminal 330 may further include other management frames, control frames, or data frames, such as a GAS Request and an Association Request. In addition, it can be understood that the second signal in this embodiment is reply and/or acknowledgement information of the first signal which is sent by the terminal 330 to the network device 120, and consequently, the second signal correspondingly includes various frames, such as an ACK (Acknowledgement), a Probe Response, a GAS Response, or an Association Response.

After the terminal receiving unit 331 obtains the second signal, the terminal 330 may establish a network connection to the first network, and for a specific connection mode, reference may be made to the prior art, and details are not described herein again. In addition, the terminal 330 mentioned throughout this specification of the present invention is, for example, a mobile phone, but is apparently not limited to a mobile phone, and may be any terminal having a WiFi network access function, including a tablet computer (PAD), and so on.

Based on the foregoing, in this embodiment, the network device 120 compares the measurement parameter of the to-be-connected terminal 330 with the access condition which is set according to the first network, and allows access of the terminal 330 when the measurement parameter satisfies the access condition. In this way, communication quality of the terminal 330 accessing the first network can be ensured, and spectral efficiency of the first network is improved.

For ease of description, the following embodiments in the whole specification of the present invention are described by using a signal strength to represent a measurement parameter, an access threshold to represent an access condition, and a WiFi network to represent a first network.

The present invention further provides a network device of a second embodiment, which is described in detail based on the network device 120 disclosed in the first embodiment. In this embodiment, a load includes a first load, a second load, and a third load, and the first load>the second load>the third load.

If the processing unit 122 determines that the load of the first network is greater than or equal to the first load, the processing unit 122 sets the access condition to a first threshold. If the load of the first network is greater than or equal to the second load and less than the first load, the processing unit 122 sets the access condition to a second threshold. If the load of the first network is greater than or equal to the third load and less than the second load, the processing unit 122 sets the access condition to a third threshold. The first threshold>the second threshold>the third threshold.

Figure 2:
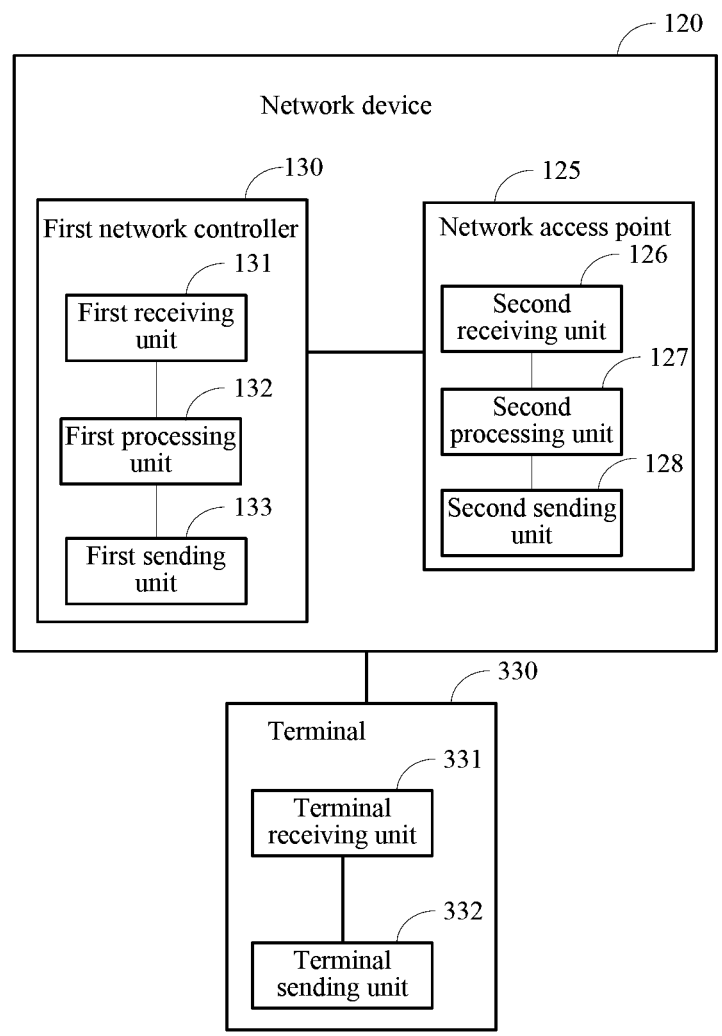
FIG. 2 is a principle block diagram of a network device and a terminal according to a third embodiment of the present invention.

The present invention further provides a network device of a third embodiment, which is described in detail based on the network device 120 disclosed in the first embodiment. In this embodiment, as shown in FIG. 2, the network device 120 further includes a first network controller 130 and a network access point 125 of the first network, and apparently, the first network controller 130 may be disposed in the first network. The first network controller 130 includes a first receiving unit 131, a first processing unit 132, and a first sending unit 133, and the network access point 125 includes a second receiving unit 126, a second processing unit 127, and a second sending unit 128. Preferably, the network access point 125 is a wireless network access point (Access Point, AP) of a WiFi network, and the first network controller 130 is an access point controller (Access Controller, AC).

The second processing unit 127 sets an access threshold according to a load of the network access point 125, and compares a signal strength of the terminal 330 with the access threshold.

Or, the first receiving unit 131 obtains a load of the network access point 125, the first processing unit 132 sets an access threshold according to the load of the network access point 125, the first sending unit 133 sends the access threshold to the second receiving unit 126, and the second processing unit 127 compares a signal strength of the terminal 330 with the access threshold.

Or, the first receiving unit 131 obtains a load of the network access point 125, the first processing unit 132 sets an access threshold according to the load of the network access point 125, and the first processing unit 132 compares a signal strength of the terminal 330 with the access threshold.

The present invention further provides a network device of a fourth embodiment, which is described in detail based on the network device 120 disclosed in the third embodiment. In this embodiment, the second receiving unit 126 receives a first signal from the terminal 330, and the second processing unit 127 obtains a signal strength of the terminal 330 according to the first signal, so that the second processing unit 127 compares the signal strength with the access threshold. Or, the second receiving unit 126 receives a first signal from the terminal 330, the second processing unit 127 obtains a signal strength of the terminal 330 according to the first signal, and the second sending unit 128 sends the signal strength to the first receiving unit 131, so that the first processing unit 132 compares the signal strength with the access threshold. Or, the first receiving unit 131 receives a first signal from the terminal, the first processing unit 132 obtains a signal strength of the terminal 330 according to the first signal, and the first processing unit 132 compares the signal strength with the access threshold.

Figure 3:
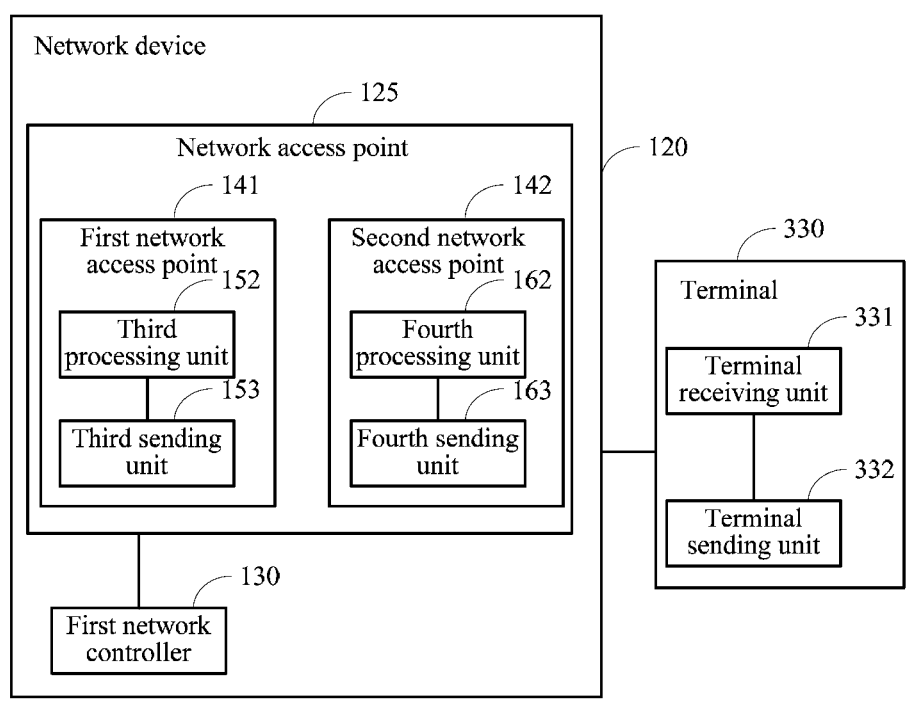
FIG. 3 is a principle block diagram of a network device and a terminal according to a fourth embodiment of the present invention.

The present invention further provides a network device of a fifth embodiment, which is described in detail based on the network device 120 disclosed in the third embodiment. In this embodiment, as shown in FIG. 3, the network access point 125 includes a first network access point 141 and a second network access point 142, the first network access point 141 includes a third processing unit 152 and a third sending unit 153, and the second network access point 142 includes a fourth processing unit 162 and a fourth sending unit 163.

The third processing unit 152 sets a first access threshold according to a load of the first network access point 141, and the third sending unit 153 sends the first access threshold to the first receiving unit 131 of the first network controller 130; the fourth processing unit 162 sets a second access threshold according to a load of the second network access point 142, and the fourth sending unit 163 sends the second access threshold to the first receiving unit 131 of the first network controller 130; the first processing unit 132 updates the first access threshold and the second access threshold according to the load of the first network access point 141 and the load of the second network access point 142.

Alternatively, the first receiving unit 131 obtains a load of the first network access point 141 and a load of the second network access point 142; the first processing unit 132 sets a first access threshold according to the load of the first network access point 141, and the first processing unit 132 sets a second access threshold according to the load of the second network access point 142; the first processing unit 132 further updates the first access threshold and the second access threshold according to the load of the first network access point 141 and the load of the second network access point 142.

Figure 4:
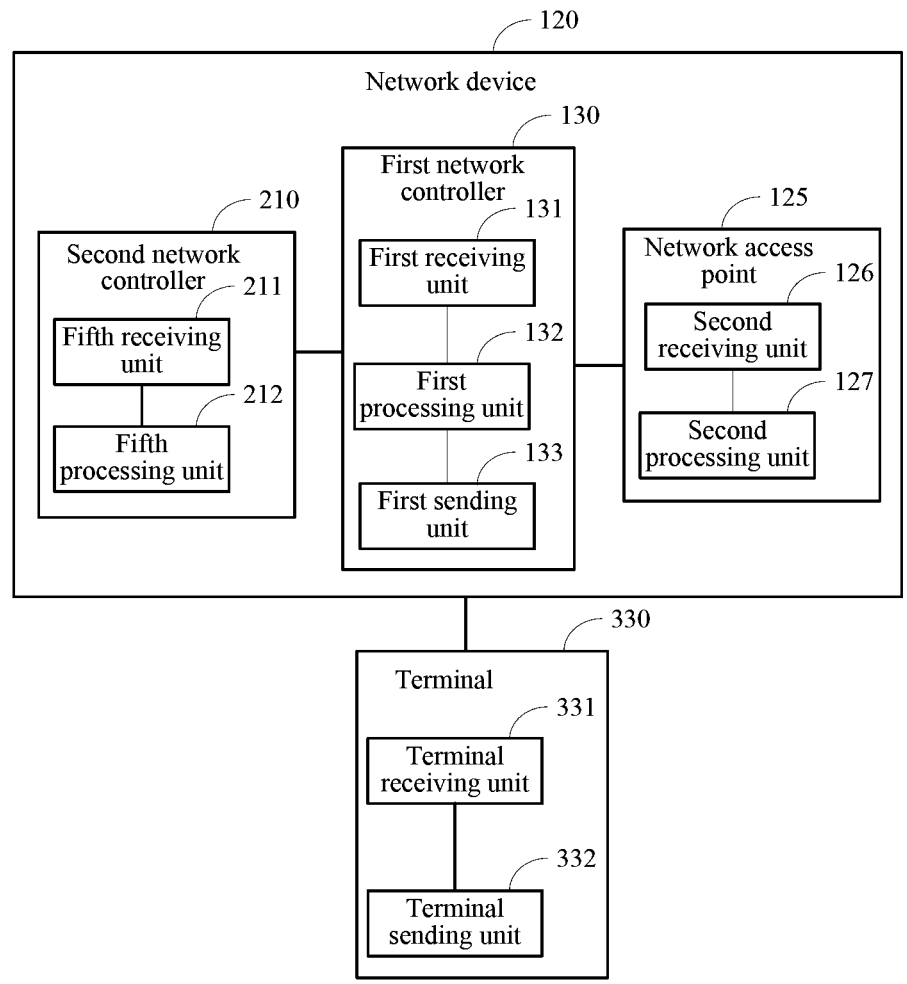
FIG. 4 is a principle block diagram of a network device and a terminal according to a fifth embodiment of the present invention.

The present invention further provides a network device of a sixth embodiment, which is described in detail based on the network device 120 disclosed in the third embodiment. In this embodiment, the first network and a second network have a topological relationship. As shown in FIG. 4, the network device 120 further includes a second network controller 210, and the second network controller 210 includes a fifth receiving unit 211 and a fifth processing unit 212.

The fifth receiving unit 211 obtains a load of the second network; the first network controller 130 obtains the load of the network access point 125; the fifth processing unit 212 updates the access threshold according to the topological relationship between the second network and the first network, the load of the second network, and the load of the network access point 125.

Alternatively, the first processing unit 132 updates the access threshold according to the topological relationship between the second network and the first network, the load of the second network, and the load of the network access point 125.

In this embodiment, the topological relationship between the first network and the second network may be manually established or automatically established by the network device. The topological relationship refers to that the second network covers the first network. The second network is preferably a cellular network, and types of the cellular network include a GSM (Global System for Mobile Communications) network, a CDMA (Code Division Multiple Access, Code Division Multiple Access) network, a 2G (2nd-generation, second-generation mobile communications technology) network, a 3G (3rd-generation, third-generation mobile communications technology) network, a 4G (4th-generation, fourth-generation mobile communications technology) network, and the like. The second network controller 210 is preferably any one of a radio network controller RNC, an evolved NodeB, eNB, a base station controller BSC, and a signaling gateway SGW.

The present invention further provides a network device of a seventh embodiment, which is described in detail based on the network device 120 disclosed in the third embodiment. In this embodiment, the processing unit 122 further determines whether the first signal sent by the to-be-connected terminal 330 carries a user class, and if the first signal carries the user class, the processing unit 122 sets the access condition according to the load of the network access point 125 and the user class. If the first signal does not carry the user class, the processing unit 122 queries for the user class of the terminal 330 from the first processing unit 132, and sets the access threshold according to the load of the network access point 125 and the user class.

Alternatively, the first processing unit 132 determines whether the first signal carries a user class, and if the first signal carries the user class, the first processing unit 132 sets the access threshold according to the load of the network access point 125 and the user class. If the first signal does not carry the user class, the first processing unit 132 queries for the user class of the terminal 330, and sets the access threshold according to the load of the network access point 125 and the user class.

The present invention further provides a network device of an eighth embodiment, which is described in detail based on the network device 120 disclosed in the third embodiment. In this embodiment, the first processing unit 132 further forms a to-be-disconnected terminal list according to a terminal 330 whose signal strength is less than or equal to a preset disconnection threshold, the first sending unit 133 sends the to-be-disconnected terminal list to the receiving unit 121, and the processing unit 122 performs a disconnecting operation according to the to-be-disconnected terminal list.

Alternatively, the second processing unit 127 performs a disconnecting operation according to a terminal whose signal strength is less than or equal to a preset disconnection threshold.

In this embodiment, the disconnection threshold is preferably a difference between the set access threshold and a preset fixed value, where the fixed value is 10 and the unit is dbm.

In the foregoing embodiments of the present invention, it should be understood that the described embodiments of the network device 120 and the terminal 330 are only exemplary; the described module division is merely division of logical functions, and other divisions may be used in an actual implementation. For example, a plurality of modules may be combined or integrated into another system, or some features may be ignored or not performed. In addition, the coupling or communication connection between the modules may be implemented by using some interfaces, or may be electrical or in other forms.

Figure 5:
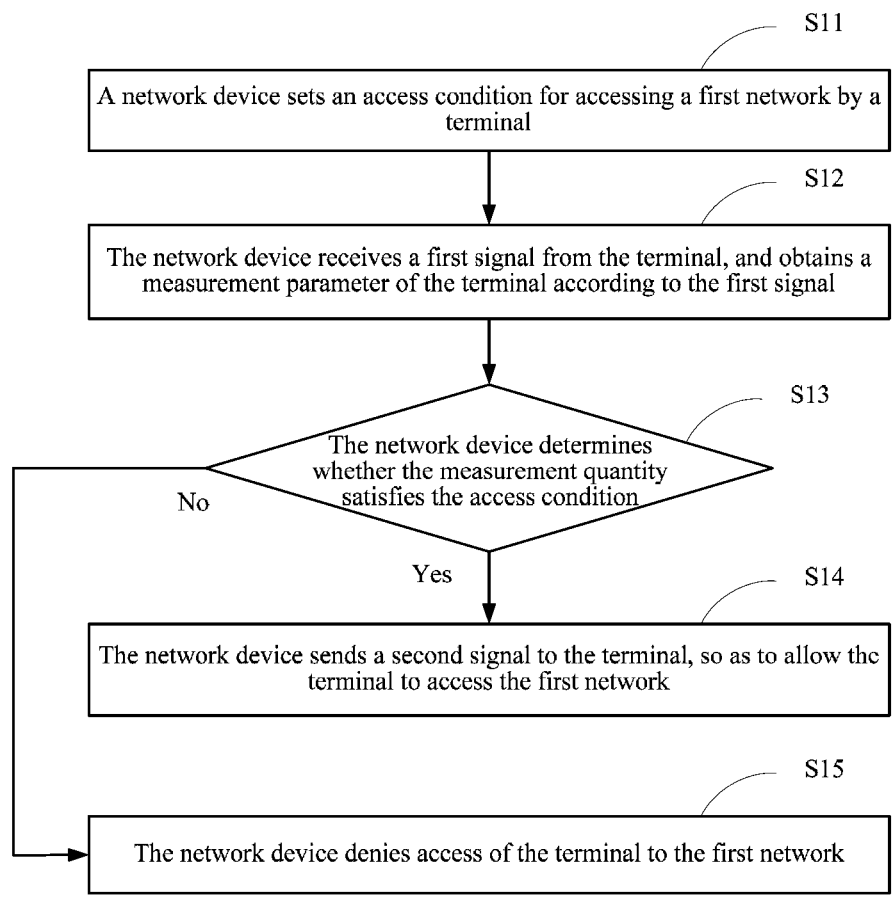
FIG. 5 is a flowchart of a load control method according to a first embodiment of the present invention.

The present invention further provides a load control method of a network device. Referring to FIG. 5, FIG. 5 is a flowchart of a load control method according to a first embodiment of the present invention. As shown in FIG. 5, the load control method disclosed in this embodiment is based on the network device 120 shown in FIG. 1. The method includes:

Step S11: The network device 120 sets an access condition of a first network.

Specifically, the network device 120 sets the access condition which must be satisfied before a terminal 330 can access the first network.

Step S12: The network device 120 receives a first signal from the terminal 330, and obtains a measurement parameter of the terminal 330 according to the first signal.

Step S13: The network device 120 determines whether the measurement parameter satisfies the access condition.

Step S14: If the measurement parameter satisfies the access condition, the network device 120 sends a second signal to the terminal 330, and the terminal 330 accesses the first network according to the second signal.

Step S15: If the measurement parameter does not satisfy the access condition, the network device 120 does not send the second signal to the terminal 330, so as to deny access of the terminal 330 to the first network.

In step S12 of this embodiment, the first signal may be obtained by the network access point 125 shown in FIG. 2 or may be obtained by the first network controller 130. In the case of obtaining the first signal by the first network controller 130, the network access point 125 transparently transmits the first signal to the first network controller 130.

All the following embodiments of the present invention are described by using a signal strength to represent a measurement parameter, an access threshold to represent an access condition, and a WiFi network to represent a first network. Further, the signal strength may be obtained by the network access point 125 by parsing the first signal received by the network access point 125, so that the network access point 125 subsequently compares the signal strength with the access threshold.

Or, after obtaining the signal strength, the network access point 125 performs determination on the signal strength according to a preset condition, and sends the signal strength which satisfies the preset condition to the first network controller 130, so that the first network controller 130 compares the signal strength with the access threshold, where the preset condition may the access condition set in step S11, or may be another condition set according to an actual requirement.

Further, or, after obtaining the signal strength, the network access point 125 directly sends the signal strength to the first network controller 130, so that the first network controller 130 compares the signal strength with the access threshold.

Further, or, the first network controller 130 directly obtains the signal strength by parsing the first signal received by the first network controller 130, and compares the signal strength with the access threshold. It should be noted that for a specific process of obtaining a signal strength according to the received first signal, reference may be made to the prior art, for example, directly measuring the signal strength of the first signal, performing a preset algorithm operation (for example, weighted averaging) on the signal strength of the first signal, or parsing a data packet of the first signal and directly reading a corresponding field.

The network device 120 obtains a load of the WiFi network through a WiFi network system or a hardware control program run by the network device 120, and then sets the access threshold according to a preset mapping relationship between loads and access thresholds, where a load may be an air interface load of a network access point AP in the WiFi network, for example, a duty cycle or the number of connected terminals, or may be a load of an AP device, for example, traffic or CPU memory usage, or may be a load of an access point controller AC in the WiFi network, for example, traffic or CPU memory usage. In addition, an access threshold may be a single threshold, for example, −80 dbm, and a network connection is allowed to be established between the terminal 330 and the WiFi network provided that the measurement parameter of the to-be-connected terminal 330 is greater than or equal to −80 dbm.

In step S12, the network device 120 obtains the first signal from the terminal 330, and there are two manners of obtaining a surrounding WiFi network signal by the terminal 330:

One manner is passive scanning, which means finding a surrounding WiFi network by listening for a beacon frame periodically sent by the network device 120. The network device 120 providing a WiFi network service sends a beacon frame periodically, and therefore the terminal 330 may be able to periodically listen for the beacon frame on a list of supported channels, so as to obtain a surrounding WiFi network signal. It should be noted that for power saving purposes, the passive scanning manner may be used preferably.

The other manner is active scanning. In a process of enabling and running a WiFi network search function, the terminal 330 periodically searches for a surrounding WiFi network signal. The terminal 330 periodically and proactively sends a probe request frame containing an SSID (Service Set Identifier) on a list of supported channels, and obtains a WiFi network signal by receiving a probe response frame returned by the network device 120.

It should be noted that step S11 and step S12 of this embodiment do not have any connection. Step S11 may be executed prior to step S12, or S12 is executed prior to step S11, which is not limited in this embodiment of the present invention.

Attention is now directed towards step 15. In another embodiment, if the measurement parameter does not satisfy the access condition, the network device 120 may also be configured to send the second signal to the terminal 330, so as to inform the terminal 330 that access to the first network by the terminal 330 is denied. The second signal may be sent by the first network controller 130 shown in FIG. 2, or may be sent by the network access point 125 after the first network controller 130 sends an instruction to the network access point 125.

In this embodiment, the network device 120 compares the measurement parameter of the to-be-connected terminal 330 with the access condition which is set according to the load of the network access point 125, and allows access of the terminal 330 when the measurement parameter satisfies the access condition. In this way, communication quality of the terminal 330 accessing the first network can be ensured, and spectral efficiency of the first network is improved.

The present invention further provides a load control method of a second embodiment, which is described in detail based on the load control method disclosed in the first embodiment. In step S11, the set access threshold may be in a fixed list which is manually set, and cannot be changed once set. That is, the access threshold is set according to a predefined mapping relationship between loads and access thresholds. The loads in the mapping relationship include a first load, a second load, and a third load, and the first load>the second load>the third load. The access thresholds set by the network device 120 include a first threshold corresponding to the first load, a second threshold corresponding to the second load, and a third threshold corresponding to the third load, and the first threshold>the second threshold>the third threshold. For details, reference to may be made to Table 1 below.

TABLE 1

| Load (unit: %) | Access threshold (unit: dbm) |
|---|---|
| 60 | −60 |
| 30 | −70 |
| 0 | −80 |

When setting the access threshold, if the load of the network access point 125 is greater than or equal to the first load 60%, the network device 120 sets the access threshold to the first threshold −60 dbm. If the load of the network access point 125 is greater than or equal to the second load 30% and less than the first load 60%, the network device 120 sets the access threshold to the second threshold −70 dbm. If the load of the network access point 125 is greater than or equal to the third load 0% and less than the second load 30%, the network device 120 sets the access threshold to the third threshold −80 dbm. The first threshold −60 dbm>the second threshold −70 dbm>the third threshold −80 dbm, indicating that when the load of the network access point 125 increases, the access threshold set by the network device 120 increases, the measurement parameter of the terminal 330 that is allowed to access increases, and an access range of the terminal 330 becomes smaller.

It should be noted that the three loads, the three corresponding access thresholds, and the corresponding specific values in the foregoing Table 1 disclosed in this embodiment are only used as examples for description; in other embodiments, a person skilled in the art may perform another setting according to an actual requirement, where the another setting is only required to satisfy the requirements that there is a one-to-one mapping relationship between a plurality of loads and a plurality of access thresholds and when the load increases, the access threshold set by the network device 120 increases, and the measurement parameter of the terminal 330 that is allowed to access increases.

Figure 6:
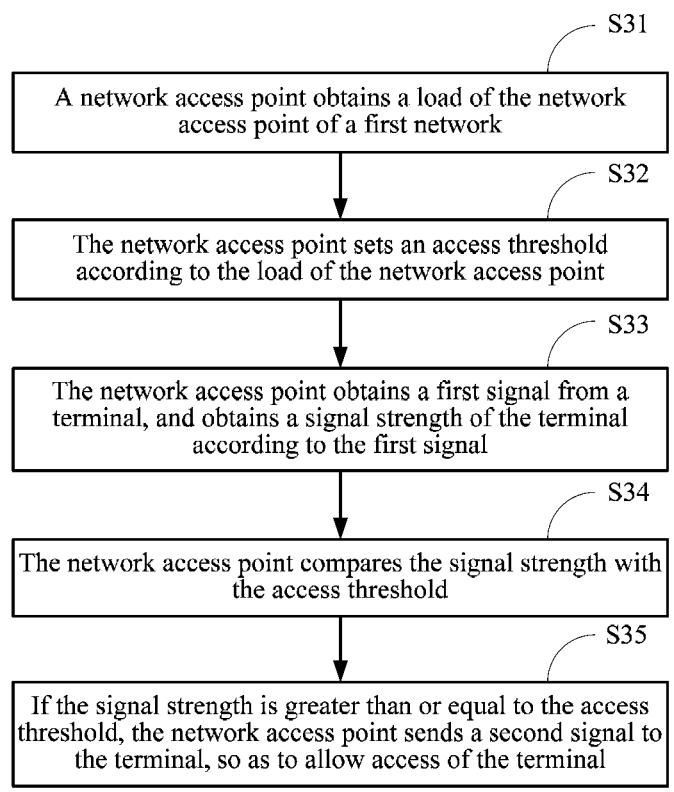
FIG. 6 is a flowchart of a load control method according to a third embodiment of the present invention.

The present invention further provides a load control method of a third embodiment, which is described in detail based on the load control method disclosed in the first embodiment. This embodiment is based on the network device 120 of the embodiment shown in FIG. 2. As shown in FIG. 6, the disclosed load control method includes:

Step S31: The network access point 125 obtains a load of a first network.

Step S32: The network access point 125 sets an access threshold according to the load.

When the network access point 125 is powered on, preferably, a mapping relationship between loads and access thresholds may be manually preset on the network access point 125, and then the network access point 125 performs setting according to the mapping relationship. The mapping relationship may be the mapping relationship, which is disclosed in the first embodiment, between a plurality of loads and a single access threshold, or may be the mapping relationship, which is disclosed in the second embodiment, between a plurality of loads and a plurality of access thresholds.

Step S33: The network access point 125 obtains a first signal from the terminal 330, and obtains a signal strength of the terminal 330 according to the first signal.

Step S34: The network access point 125 compares the signal strength with the access threshold.

Step S35: If the signal strength is greater than or equal to the access threshold, the network access point 125 sends a second signal to the terminal 330, so as to allow access of the terminal 330.

The present invention further provides a load control method of a fourth embodiment, which is described in detail based on the load control method disclosed in the third embodiment. A network device of this embodiment is based on the network device 120 of the embodiment shown in FIG. 2, and a difference between the load control method of this embodiment and that of the third embodiment shown in FIG. 6 lies in that:

In step S31, the first network controller 130 obtains a load of the network access point 125 of a first network, and in step S32, the first network controller 130 sets an access threshold according to the load of the network access point 125; specifically, when the first network controller 130 is powered on, the first network controller 130 may perform setting according to a preset mapping relationship between loads and access thresholds. After the access threshold is set, the first network controller 130 sends the access threshold to the network access point 125, and then the network access point 125 compares a signal strength of the to-be-connected terminal 330 with the access threshold.

The present invention further provides a load control method of a fifth embodiment, which is described in detail based on the load control method disclosed in the fourth embodiment. A difference between the load control method of this embodiment and that of the fourth embodiment lies in that:

After the access threshold is set, the first network controller 130 sends the access threshold to the network access point 125, and then the first network controller 130 compares a signal strength of the to-be-connected terminal 330 with the access threshold.

The present invention further provides a load control method of a sixth embodiment, which is described in detail based on the load control method disclosed in the fourth embodiment. In step S35 of this embodiment, if the signal strength is greater than or equal to the access threshold, the network access point 125 sends the load of the first network to the first network controller 130, and the first network controller 130 sends a second signal to the terminal 330 according to load balancing of the first network and through the network access point 125, so as to allow the terminal 330 to access the network access point 125 of the first network.

The load balancing means that the first network controller 130 allows the terminal 330 to access the first network through a network access point which has a minimum load among a plurality of network access points of the first network. Specifically, when a plurality of network access points 125 is disposed in the first network, if the signal strength is greater than or equal to the access threshold, each network access point 125 sends a load thereof to the first network controller 130, and the first network controller 130 selects a network access point 125 which has a minimum load, and sends the second signal to the terminal 330 through the selected network access point, so as to allow the terminal 330 to access the network access point 125 which has the minimum load.

It should be noted that in other embodiments, a rated load may also be set, and if the load of the network access point 125 which has the minimum load and is selected by the first network controller 130 is still greater than or equal to the rated load, access to the first network by the terminal 330 is denied.

The present invention further provides a load control method of a seventh embodiment, which is described in detail based on the load control method disclosed in the sixth embodiment. A difference between the load control method of this embodiment and that of the fourth embodiment lies in that:

In step S35 of this embodiment, the network access point 125 sends the load of the first network to the first network controller 130, and the first network controller 130 sends a second signal to the terminal 330 after performing load balancing according to the load of the first network, so as to allow the terminal 330 to access the network access point 125 of the first network.

Figure 7:
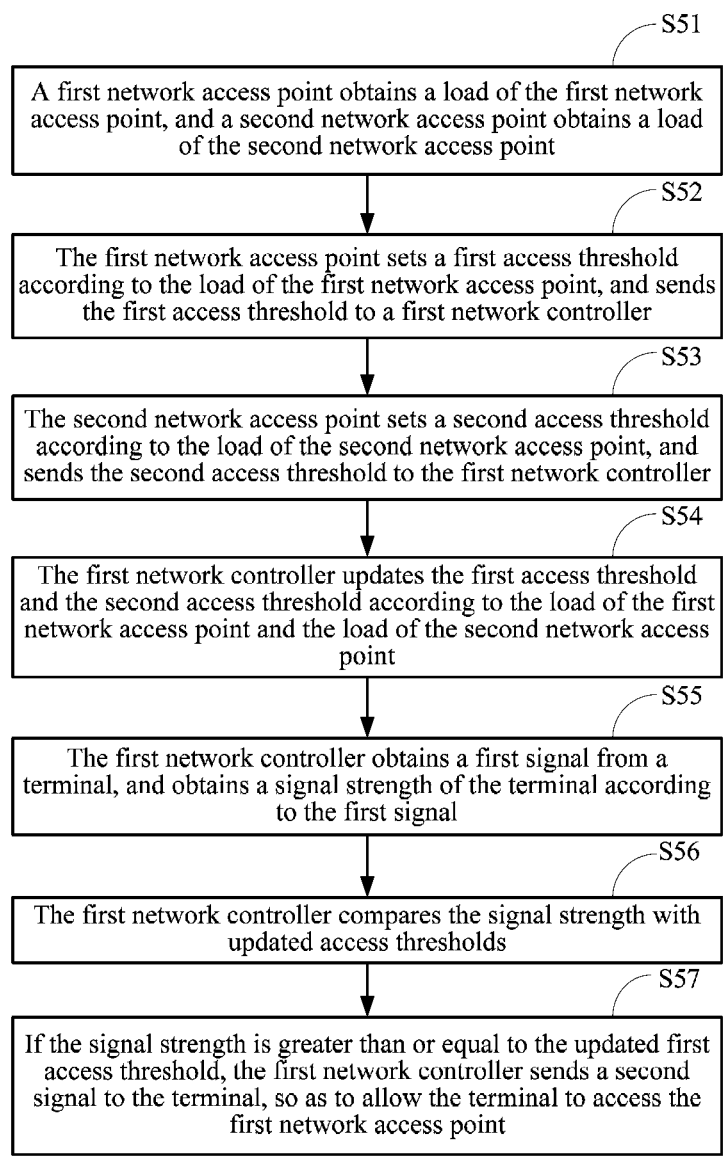
FIG. 7 is a flowchart of a load control method according to an eighth embodiment of the present invention.

The present invention further provides a load control method of an eighth embodiment, which is described in detail based on the load control method disclosed in the first embodiment. In this embodiment, a network device is based on the network device 120 of the embodiment shown in FIG. 3. As shown in FIG. 7, the disclosed load control method includes:

Step S51: The first network access point 141 obtains a load of the first network access point 141, and the second network access point 142 obtains a load of the second network access point 142.

Step S52: The first network access point 141 sets a first access threshold according to the load of the first network access point 141, and sends the first access threshold to the first network controller 130.

Step S53: The second network access point 142 sets a second access threshold according to the load of the second network access point 142, and sends the second access threshold to the first network controller 130.

Step S54: The first network controller 130 updates the first access threshold and the second access threshold according to the load of the first network access point 141 and the load of the second network access point 142.

Step S55: The first network controller 130 obtains a first signal from the terminal 330, and obtains a signal strength of the terminal 330 according to the first signal.

Step S56: The first network controller 130 compares the signal strength with the updated access thresholds.

Step S57: If the signal strength is greater than or equal to the updated first access threshold, the first network controller 130 sends a second signal to the terminal 330, so as to allow the terminal 330 to access the first network access point 141.

In step S54 of this embodiment, the first network controller 130 compares the load of the first network access point 141 and the load of the second network access point 142. If the load of the first network access point 141 is greater than the load of the second network access point 142, the first network controller 130 updates the first access threshold and the second access threshold, so that an updated access threshold of the first network access point 141 is greater than the first access threshold, and an updated access threshold of the second network access point 142 is less than the second access threshold. If the load of the first network access point 141 is less than the load of the second network access point 142, the first network controller 130 updates the first access threshold and the second access threshold, so that an updated access threshold of the first network access point 141 is less than the first access threshold, and an updated access threshold of the second network access point 142 is greater than the second access threshold. If the load of the first network access point 141 is equal to the load of the second network access point 142, which indicates that the to-be-connected terminal 330 may access either of the first network and the second network, the first network controller 130 does not update the first access threshold or the second access threshold.

Specifically, in the foregoing updating, the first network controller 130 generates an update value, and performs an operation on the first access threshold and the second access threshold according to the update value. When the update value is an absolute value, the first network controller 130 may directly replace the first access threshold or the second access threshold with the absolute value, so as to obtain an updated access threshold. When the update value is a relative value, the first network controller 130 may add the relative value to the first access threshold or the second access threshold, so as to obtain an updated access threshold. It should be understood that in other embodiments, the first network controller 130 may further generate a first update value and a second update value, and perform an operation on the first access threshold and the first update value and an operation on the second access threshold and the second update value, so as to obtained updated access thresholds.

The present invention further provides a load control method of a ninth embodiment, which is described in detail based on the load control method disclosed in the eighth embodiment. A difference between this embodiment and the eighth embodiment shown in FIG. 7 lies in that:

In step S51, the first network controller 130 obtains a load of the first network access point 141 and a load of the second network access point 142. In step S52 and step S53, the first network controller 130 updates a first access threshold and a second access threshold.

In addition, it should be understood that in the examples of this embodiment and the foregoing eighth embodiment, there are two network access points, namely, the first network access point 141 and the second network access point 142 of the first network; in other embodiments, the first network may be configured to include a plurality of network access points.

In the foregoing eighth embodiment and ninth embodiment, when a plurality of adjacent networks is networked, access thresholds of a plurality of network access points can be updated correspondingly. In this way, an access threshold of a network access point with a high load can be decreased, and an access threshold of a network access point with a low load can be increased, so that a terminal 330 preferably accesses a network access point with a relatively low load, thereby implementing optimized allocation of network resources, ensuring quality of communication between the terminal 330 and an accessed network, and further improving spectral efficiency of a network access point.

Figure 8:
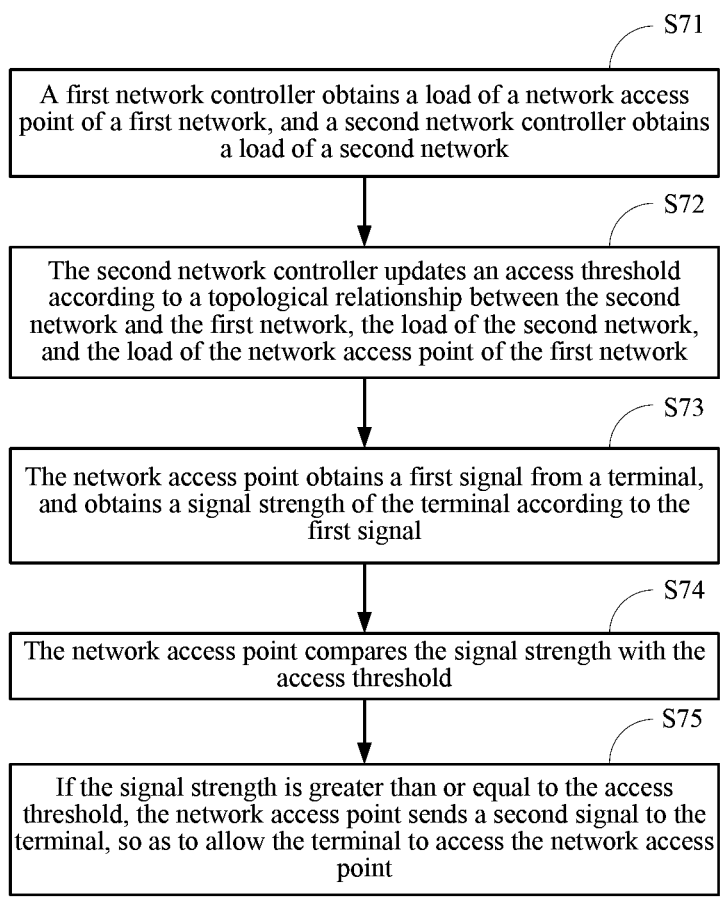
FIG. 8 is a flowchart of a load control method according to a tenth embodiment of the present invention.

The present invention further provides a load control method of a tenth embodiment, which is described in detail based on the load control method disclosed in the first embodiment. In this embodiment, a network device is based on the network device 120 of the embodiment shown in FIG. 4. As shown in FIG. 8, the load control method disclosed in this embodiment includes:

Step S71: The first network controller 130 obtains a load of the network access point 125 of a first network, and the second network controller 210 obtains a load of a second network.

Step S72: The second network controller 210 updates an access threshold according to a topological relationship between the second network and the first network, the load of the second network, and the load of the network access point 125 of the first network.

Step S73: The network access point 125 obtains a first signal from the terminal 330, and obtains a signal strength of the terminal 330 according to the first signal.

Step S74: The network access point 125 compares the signal strength with the access threshold.

Step S75: If the signal strength is greater than or equal to the access threshold, the network access point 125 sends a second signal to the terminal 330, so as to allow the terminal 330 to access the network access point 125.

In this embodiment, the topological relationship refers to that the second network covers the first network, and the two overlap each other to implement networking. The second network is preferably a cellular network covering the first network (WiFi network), and the second network controller 210 is preferably any one of a radio network controller RNC, an evolved NodeB, eNB, a base station controller BSC, and a signaling gateway SGW. In addition, in step S72, the second network controller 210 may update the access condition of the network access point 125 according to Table 2 below.

TABLE 2

| | Cellular network | |
|---|---|---|
| First network | The load is light | The load is heavy |
| The load of the network access point is light | Increase the access threshold | Decrease the access threshold |
| The load of the network access point is heavy | Increase the access threshold | Do not adjust the access threshold |

Referring to Table 2, in step S72, when the load of the network access point 125 of the first network is light and the load of the second network is light, the second network controller 210 increases the access threshold, so that an updated access threshold is greater than the access threshold prior to being updated. When the load of the network access point 125 of the first network is light and the load of the second network is heavy, the second network controller 210 decreases the access threshold, so that an updated access threshold is less than the access threshold prior to being updated. When the load of the network access point 125 of the first network is heavy and the load of the second network is light, the second network controller 210 increases the access threshold, so that an updated access threshold is greater than the access threshold prior to being updated. When the load of the network access point 125 of the first network is heavy and the load of the second network is heavy, the second network controller 210 does not adjust the access threshold, so that an updated access threshold is equal to the access threshold prior to being updated.

Specifically, in the updating step, the first network controller 130 sends the obtained load of the network access point 125 of the first network to the second network controller 210, and the second network controller 210 generates an update value according to this load and the load of the second network which is obtained by the second network controller 210, and delivers the update value, where the update value is an absolute value or a relative value; the first network controller 130 receives the update value and updates the access threshold of the network access point 125 of the first network. A specific updating process is similar to the updating process of the foregoing eighth embodiment, and therefore details are not described herein again.

In other embodiments, after generating an update value, the second network controller 210 does not deliver the update value to the first network controller 130. Instead, the second network controller 210 updates the access threshold of the network access point 125 of the first network, and then delivers an updated access threshold to the first network controller 130. In addition, when the update value is an absolute value, the second network controller 210 may directly replace the access threshold prior to being updated with the absolute value, so as to obtain an updated access threshold. When the update value is a relative value, an updated access threshold may be obtained according to the following formula:

access threshold=adjustment step*
(reference load−load of the second network),
where the reference load is a preset rated load of the second network, and a value range of the adjustment step is (0, 20], where in this embodiment, a default value is preferably 5, and the unit is db.

In addition, in step S72 of other embodiments, the first network controller 130 may update the access condition according to the topological relationship, the load of the second network, and the load of the network access point 125.

In this embodiment, when a plurality of networks having a topological relationship is networked, an access threshold of a network covered by another network can be updated. An access threshold of a network access point with a high load is decreased, and an access threshold of a network access point with a low load is increased, so that a terminal 330 accesses a network access point with an optimal load, thereby implementing optimized allocation of network resources, ensuring quality of communication between the terminal 330 and an accessed network, and further improving spectral efficiency of network access points of a plurality of networks.

Figure 9:
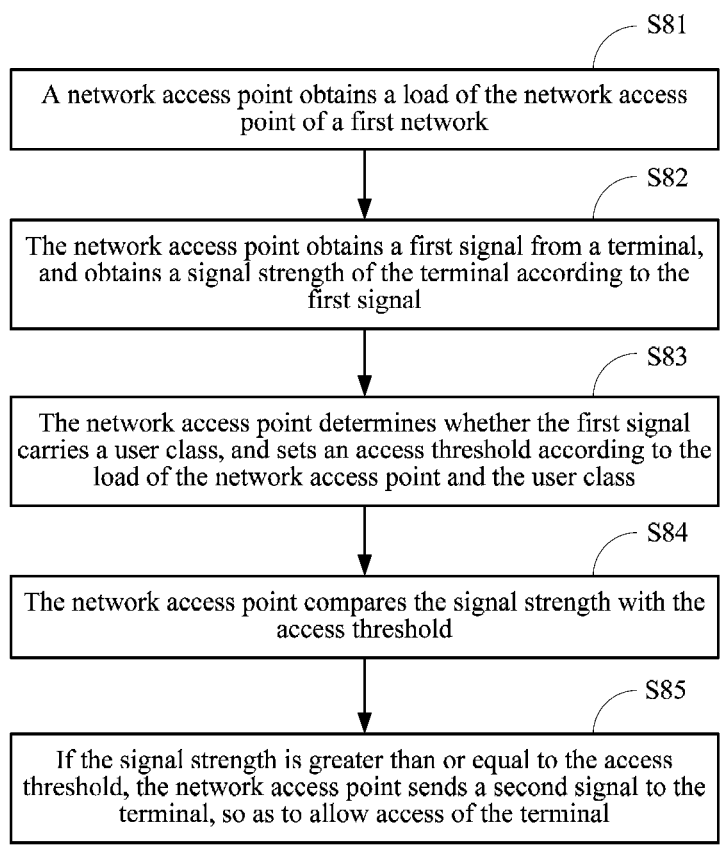
FIG. 9 is a flowchart of a load control method according to an eleventh embodiment of the present invention.

The present invention further provides a load control method of an eleventh embodiment, which is described in detail based on the load control method disclosed in the first embodiment. In this embodiment, a network device is based on the network device 120 of the embodiment shown in FIG. 2. As shown in FIG. 9, the load control method disclosed in this embodiment includes:

Step S81: The network access point 125 obtains a load of the network access point 125.

Step S82: The network access point 125 obtains a first signal from the terminal 330, and obtains a signal strength of the terminal 330 according to the first signal.

Step S83: The network access point 125 determines whether the first signal carries a user class, and sets an access threshold according to the load of the network access point 125 and the user class.

Step S84: The network access point 125 compares the signal strength with the access threshold.

Step S85: If the signal strength is greater than or equal to the access threshold, the network access point 125 sends a second signal to the terminal 330, so as to allow access of the terminal 330.

In step S83 of this embodiment, if it is determined by demodulating that the first signal carries the user class, the network access point 125 sets an access threshold according to the load of the network access point 125 and the user class. If it is determined that the first signal does not carry the user class, the network access point 125 queries, from the first network controller 130, for the user class of the terminal 330 sending the first signal, and sets an access threshold according to the load of the network access point 125 and the user class. For a mapping relationship among user classes, loads of the network access point 125, and access thresholds, reference may be made to Table 3 below.

TABLE 3

| Load (unit: %) | Access threshold (unit: dbm) | |
| --- | --- | --- |
| 60% | User class is high | −80 |
| | User class is low | −60 |
| 30% | User class is high | −90 |
| | User class is low | −70 |
| 0% | User class is high | −∞ |
| | User class is low | −80 |

That is, if the load of the network access point 125 obtained by the network access point 125 is 60%, and it is determined that the user class carried in the first signal is high, the access threshold is set to −80 dbm. If the load of the network access point 125 obtained by the network access point 125 is 60%, and it is determined that the user class carried in the first signal is low, the access threshold is set to −60 dbm. If the load of the network access point 125 obtained by the network access point 125 is 30%, and it is determined that the user class carried in the first signal is high, the access threshold is set to −90 dbm. If the load of the network access point 125 obtained by the network access point 125 is 30%, and it is determined that the user class carried in the first signal is low, the access threshold is set to −70 dbm. If the load of the network access point 125 obtained by the network access point 125 is 0%, and it is determined that the user class carried in the first signal is high, the access threshold is set to −∞ dbm, that is, no access threshold is set. If the load of the network access point 125 obtained by the network access point 125 is 0%, and it is determined that the user class carried in the first signal is low, the access threshold is set to −80 dbm.

It should be noted that in the example of this embodiment, three loads are set, only two user classes are classified, and the specific values of the access thresholds in the foregoing Table 3 are only used as examples for description; in other embodiments, a person skilled in the art may classify user classes otherwise according to an actual requirement, provided that at a same load level, the higher a user class is, the lower an access threshold is.

It should be understood that in other embodiments, when all user classes are high, the network access point 125 may set no access threshold, that is, the access threshold is $-\infty$, and set an access threshold of the network access point 125 only when a user class is low.

The present invention further provides a load control method of a twelfth embodiment, which is described in detail based on the load control method disclosed in the eleventh embodiment. A difference between this embodiment and the foregoing eleventh embodiment lies in that:

In step S81, the first network controller 130 obtains a load of the network access point 125 of a first network. In step S83, the first network controller 130 determines whether the first signal carries a user class, and sets an access threshold according to the load of the network access point 125 and the user class. That is, if it is determined by demodulating that the first signal carries the user class, the first network controller 130 sets an access threshold according to the load of the network access point 125 and the user class. If it is determined that the first signal does not carry the user class, the first network controller 130 queries for the user class of the terminal 330 sending the first signal, and sets an access threshold according to the load of the network access point 125 and the user class.

In addition, in a specific step of setting the access condition in this embodiment, the first network controller 130 generates an update value, and when the update value is an absolute value, the first network controller 130 may directly replace the access threshold prior to being updated with the absolute value, so as to obtain an updated access threshold. When the update value is a relative value, an updated access threshold may be obtained according to the following formula:

$$\text{access threshold} = \text{adjustment step} * (\text{user class} - \text{lowest user class}), \text{ where}$$

a value range of the adjustment step is (0, 20], where in this embodiment, a default value is preferably 10, and the unit is db, the user class is a user class corresponding to the terminal sending the first signal, and the lowest user class is a preset lowest user class at which the terminal 330 is allowed to access the first network.

In this embodiment and the eleventh embodiment, because user classes of to-be-connected terminals 330 are classified, access of a terminal 330 with a low user class is restricted. In this way, class-based allocation of network resources of the first network can be implemented, thereby ensuring quality of communication between the terminal 330 and the first network, and improving spectral efficiency of a network access point 125.

Figure 10:
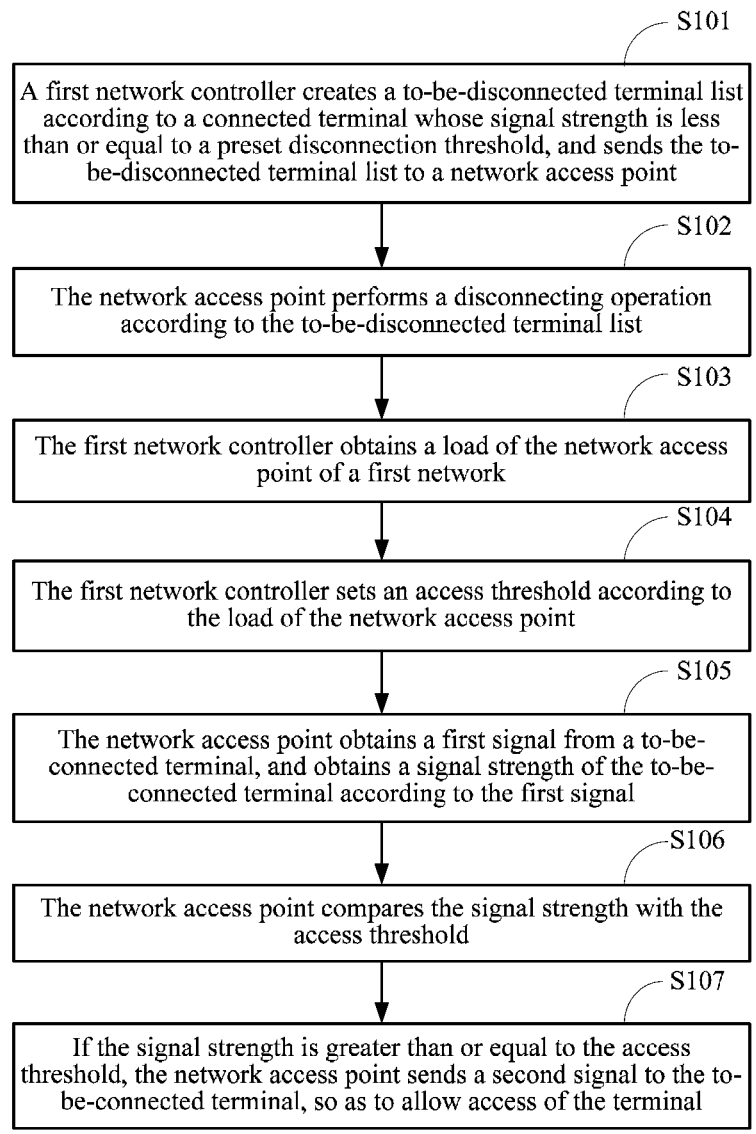
FIG. 10 is a flowchart of a load control method according to a thirteenth embodiment of the present invention.

The present invention further provides a load control method of a thirteenth embodiment, which is described in detail based on the load control method disclosed in the first embodiment. In this embodiment, a network device is based on the network device 120 of the embodiment shown in FIG. 2. As shown in FIG. 10, the load control method disclosed in this embodiment includes:

Step S101: The first network controller 130 forms a to-be-disconnected terminal list according to a connected terminal 330 whose signal strength is less than or equal to a preset disconnection threshold, and sends the to-be-disconnected terminal list to the network access point 125.

Step S102: The network access point 125 performs a disconnecting operation according to the to-be-disconnected terminal list.

Step S103: The first network controller 130 obtains a load of the network access point 125 of a first network.

Step S104: The first network controller 130 sets an access condition according to the load of the network access point 125.

Step S105: The network access point 125 obtains a first signal from a to-be-connected terminal 330, and obtains a signal strength of the to-be-connected terminal 330 according to the first signal.

Step S106: The network access point 125 compares the signal strength with the access threshold.

Step S107: If the signal strength is greater than or equal to the access threshold, the network access point 125 sends a second signal to the to-be-connected terminal 330, so as to allow access of the terminal 330.

In step S101 of this embodiment, the disconnection threshold is preferably a difference between the set access threshold and a preset fixed value, where the fixed value is 10 and the unit is dbm.

The present invention further provides a load control method of a fourteenth embodiment, which is described in detail based on the load control method disclosed in the thirteenth embodiment. A difference between this embodiment and the foregoing twelfth embodiment lies in that:

In steps S101 and S102, the network access point 125 directly compares a signal strength of a connected terminal 330 with a disconnection threshold, and the network access point 125 performs a disconnecting operation.

In this embodiment and the thirteenth embodiment, before a to-be-connected terminal 330 sends a first signal, a connected terminal 330 whose signal strength is less than or equal to a disconnection threshold is disconnected from the first network, which reduces a load of the first network, thereby ensuring quality of communication between the newly connected terminal 330 and the first network, and further improving spectral efficiency of the network access point 125 of the first network.

Figure 11:
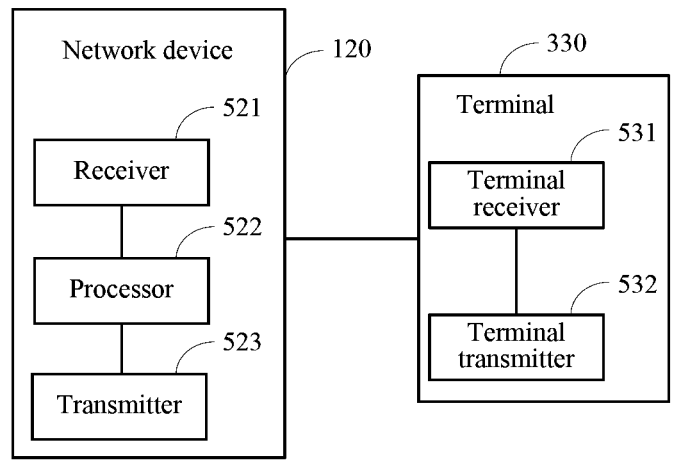
FIG. 11 is a schematic structural diagram of a network device and a terminal according to a first embodiment of the present invention.

The present invention further provides a network device, which is described in detail based on the network device 120 disclosed in the first embodiment. As shown in FIG. 11, the network device 120 disclosed in this embodiment includes a receiver 421, a processor 422, and a transmitter 423. The network device 120 of this embodiment is configured to establish a network connection to a terminal 330, where the terminal 330 includes a terminal receiver 531 and a terminal transmitter 532.

The terminal transmitter 532 sends a first signal for requesting access; the receiver 521 obtains the first signal and obtains a load of a first network; the processor 522 sets an access condition according to the load, obtains a measurement parameter of the terminal 330 according to the first signal, and compares the measurement parameter with the access condition; if the measurement parameter is greater than or equal to the access condition, the transmitter 523 sends a second signal to the terminal 330; the terminal receiver 531 receives the second signal, and the terminal 330 accesses the first network according to the second signal, thereby establishing a network connection.

Figure 12:
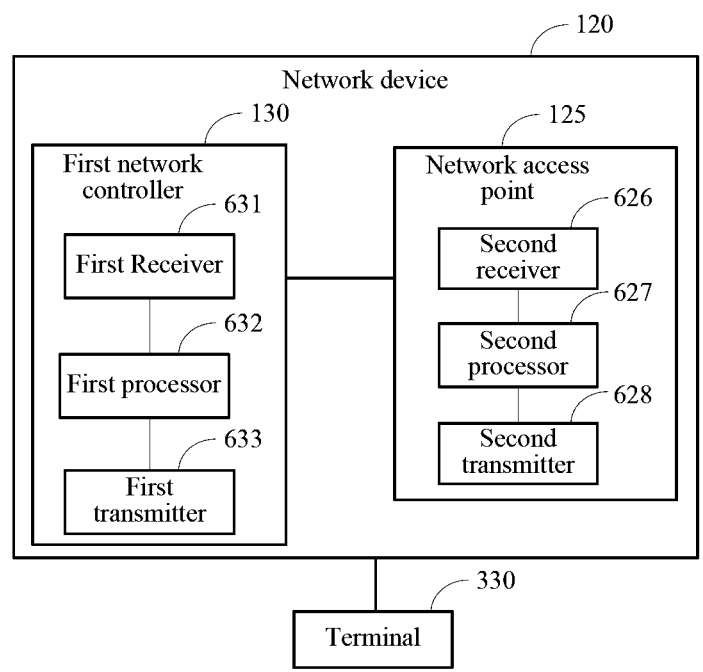
FIG. 12 is a schematic structural diagram of a network device and a terminal according to a second embodiment of the present invention.

The present invention further provides a network device, which is described in detail based on the network device 120 shown in FIG. 11. In this embodiment, as shown in FIG. 12, a network device 120 includes a network access point 125 and a first network controller 130 of a first network, the first network controller 130 includes a first receiver 631, a first processor 632, and a first transmitter 633, and the network access point 125 includes a second receiver 626, a second processor 627, and a second transmitter 628.

The second processor 627 sets an access threshold according to a load of the network access point 125, and compares a signal strength of a terminal 330 with the access threshold.

Or, the first receiver 631 obtains a load of the network access point 125; the first processor 632 sets an access threshold according to the load of the network access point 125; the first transmitter 633 sends the access threshold to the second receiver 626; and the second processor 627 compares a signal strength of a terminal 330 with the access threshold.

Or, the first receiver 631 obtains a load of the network access point 125; the first processor 632 sets an access threshold according to the load of the network access point 125; and the first processor 632 compares a signal strength of a terminal 330 with the access threshold.

In conclusion, in the present invention, a measurement parameter of a to-be-connected terminal 330 is compared with an access condition set according to a load of a network access point 125, and when the measurement parameter is greater than or equal to the access condition, access of the terminal 330 is allowed, thereby improving spectral efficiency of the network access point 125.

The foregoing descriptions are merely embodiments of the present invention other than limiting the scope of the present invention. Any equivalent structural or procedural replacement made according to this specification or the accompanying drawings, or direct or indirect application of the present invention to other related technical fields shall fall within the protection scope of the present invention.

What is claimed is:

1. A load control method of a network device, comprising:
   setting, by the network device, an access condition for accessing a first network by a terminal;
   receiving, by the network device, a first signal from the terminal;
   obtaining, by the network device, a measurement parameter of the terminal according to the first signal, and comparing the measurement parameter with the access condition, wherein the measurement parameter is at least one of a signal strength of the terminal and a distance between the terminal and the network device; and
   sending, by the network device, a second signal to the terminal, so as to allow the terminal to access the first network when the measurement parameter of the terminal satisfies the access condition;
   wherein the access condition comprises one of the following:
   (a) the measurement parameter is greater than or equal to a preset measurement parameter threshold,
   (b) a fluctuation of the measurement parameter is less than or equal to a preset fluctuation threshold of the measurement parameter, and
   (c) a frequency of fluctuation in the measurement parameter is less than or equal to a preset frequency of fluctuation in the measurement parameter.

2. The method according to claim 1, further comprising:
   if the measurement parameter of the terminal does not satisfy the access condition, skipping sending, by the network device, the second signal to the terminal, so as to deny access of the terminal to the first network; or
   if the measurement parameter of the terminal does not satisfy the access condition, sending, by the network device, a third signal to the terminal, so as to deny the access of the terminal to the first network.

3. The method according to claim 1, wherein the network device comprises a network access point and a first network controller of the first network, and the setting, by the network device, the access condition for accessing the first network by the terminal further comprises one of the following:
   obtaining, by the network access point, a load of the network access point of the first network, and setting the access condition according to the load, so as to compare the measurement parameter of the terminal with the access condition;
   obtaining, by the first network controller, the load of the network access point of the first network, and setting the access condition according to the load, sending, by the first network controller, the access condition to the network access point, and comparing, by the network access point, the measurement parameter of the terminal with the access condition; and
   obtaining, by the first network controller, the load of the network access point of the first network, setting the access condition according to the load, and comparing the measurement parameter of the terminal with the access condition.

4. The method according to claim 3, wherein the receiving, by the network device, the first signal from the terminal, and obtaining the measurement parameter of the terminal according to the first signal comprises one of the following:
   receiving, by the network access point, the first signal from the terminal, and obtaining the measurement parameter of the terminal according to the first signal, and sending, by the network access point, the measurement parameter to the first network controller, so that the first network controller compares the measurement parameter with the access condition; and
   receiving, by the first network controller, the first signal from the terminal, and obtaining the measurement parameter of the terminal according to the first signal, and comparing, by the first network controller, the measurement parameter with the access condition.

5. The method according to claim 3, wherein the sending, by the network device, the second signal to the terminal, if the measurement parameter of the terminal satisfies the access condition, comprises one of the following:
   (a) if the network access point determines, by comparison, that the measurement parameter of the terminal satisfies the access condition, sending, by the network access point, the second signal to the terminal, so as to allow the terminal to access the first network;
   (b) if the network access point determines, by comparison, that the measurement parameter of the terminal satisfies the access condition, sending, by the network access point, a load of the first network to the first network controller, and sending, by the first network controller, the second signal to the terminal according to load balancing of the first network and through the network access point, so as to allow the terminal to access the first network; and
   (c) if the first network controller determines, by comparison, that the measurement parameter of the terminal satisfies the access condition, sending, by the first network controller, the second signal to the terminal according to the load balancing of the first network, so as to allow the terminal to access the first network;

wherein the load balancing comprises that the first network controller allows the terminal to access the first network through a network access point which has a minimum load among a plurality of network access points of the first network.

6. The method according to claim 3, wherein the network access point comprises a first network access point and a second network access point, wherein:
the setting, by the network access point, the access condition according to the load of the network access point of the first network comprises:
setting, by the first network access point, a first access condition according to a load of the first network access point, and sending the first access condition to the first network controller, setting, by the second network access point, a second access condition according to a load of the second network access point, and sending the second access condition to the first network controller, and updating, by the first network controller, the first access condition and the second access condition according to the load of the first network access point and the load of the second network access point;
the obtaining, by the first network controller, the load of the network access point of the first network, and setting the access condition according to the load comprises:
obtaining, by the first network controller, the load of the first network access point and the load of the second network access point, setting, by the first network controller, the first access condition according to the load of the first network access point, and setting the second access condition according to the load of the second network access point, and further updating, by the first network controller, the first access condition and the second access condition according to the load of the first network access point and the load of the second network access point.

7. The method according to claim 3, wherein the first network and a second network have a topological relationship, and the network device comprises a second network controller, wherein:
the second network controller obtains a load of the second network, and obtains the load of the network access point of the first network through the first network controller, and the second network controller updates the access condition according to the topological relationship, the load of the second network, and the load of the network access point; or
the first network controller obtains a load of the second network and the load of the network access point of the first network, and the first network controller updates the access condition according to the topological relationship, the load of the second network, and the load of the network access point.

8. A network access point, applied in a network device, wherein the network access point comprises a receiving unit, a processing unit, and a sending unit; the receiving unit is configured to receive a first signal from a terminal, the processing unit is configured to set an access condition for accessing a first network by the terminal, and obtain a measurement parameter of the terminal according to the first signal, so as to determine whether the measurement parameter satisfies the access condition, and
if the processing unit determines, by comparison, that the measurement parameter satisfies the access condition, the sending unit is configured to send a second signal to the terminal, so as to allow the terminal to access the first network;
wherein the measurement parameter is at least one of a signal strength of the terminal and a terminal distance of the terminal, wherein the terminal distance is a distance between the terminal and the network device, and
wherein the access condition comprises one of the following:
(a) the measurement parameter is greater than or equal to a preset measurement parameter threshold,
(b) a fluctuation of the measurement parameter is less than or equal to a preset fluctuation threshold of the measurement parameter, and
(c) a frequency of fluctuation in the measurement parameter is less than or equal to a preset frequency of fluctuation in the measurement parameter.

9. The network access point according to claim 8, wherein
if the processing unit determines that the measurement parameter of the terminal does not satisfy the access condition, the sending unit does not send the second signal to the terminal, so as to deny access of the terminal to the first network; or
if the processing unit determines that the measurement parameter of the terminal does not satisfy the access condition, the sending unit is configured to send a third signal to the terminal, so as to deny the access of the terminal to the first network.

10. The network access point according to claim 8, wherein the network device further comprises a first network controller, and
the processing unit is further configured to set the access condition according to a load of the first network, and compare the measurement parameter of the terminal with the access condition;
the receiving unit is further configured to receive the access condition which is set according to the load of the first network sent by the first network controller, and compare the measurement parameter of the terminal with the access condition.

11. The network access point according to claim 10, wherein:
the receiving unit is configured to receive the first signal from the terminal, and the processing unit is configured to obtain the measurement parameter of the terminal according to the first signal, and compare the measurement parameter with the access condition; or
the receiving unit is configured to receive the first signal from the terminal, the processing unit is configured to obtain the measurement parameter of the terminal according to the first signal, and the sending unit is configured to send the measurement parameter to the first network controller, so that the first network controller compares the measurement parameter with the access condition.

12. The network access point according to claim 10, wherein:
if the processing unit determines, by comparison, that the measurement parameter of the terminal satisfies the access condition, the sending unit is configured to send the load of the first network to the first network controller, so that the first network controller sends the signal to the terminal according to load balancing of the first network and through the sending unit, so as to allow the terminal to access the first network;

wherein the load balancing comprises that the first network controller allows the terminal to access the first network through a network access point which has a minimum load among a plurality of network access points of the first network.

13. The network access point according to claim 10, wherein the network access point comprises a first network access point and a second network access point, wherein the processing unit and the sending unit in the network access point are a second processing unit and a second sending unit, respectively, the first network access point comprises a third processing unit and a third sending unit, and the second network access point comprises a fourth processing unit and a fourth sending unit, wherein:
the third processing unit is configured to set a first access condition according to a load of the first network access point, the third sending unit is configured to send the first access condition to the first network controller, the fourth processing unit is configured to set a second access condition according to a load of the second network access point, and the fourth sending unit is configured to send the second access condition to the first network controller, so that the first network controller updates the first access condition and the second access condition according to the load of the first network access point and the load of the second network access point.

14. A first network controller, applied in a network device, wherein the first network controller comprises a first receiving unit, a processing unit, and a sending unit;
the receiving unit is configured to receive a first signal from a terminal,
the processing unit is configured to set an access condition for accessing a first network by the terminal, and obtain a measurement parameter of the terminal according to the first signal, so as to determine whether the measurement parameter satisfies the access condition, and
when the processing unit determines, by comparison, that the measurement parameter satisfies the access condition, the receiving unit is configured to receive a load of the first network which is sent by a network access point comprised in the network device, and the sending unit is configured to send a second signal to the terminal according to load balancing of the first network and through the network access point, so as to allow the terminal to access the first network;
wherein the measurement parameter is at least one of a signal strength of the terminal and a distance between the terminal and the network device, and
wherein the access condition comprises one of the following:
(a) the measurement parameter is greater than or equal to a preset measurement parameter threshold,
(b) a fluctuation of the measurement parameter is less than or equal to a preset fluctuation threshold of the measurement parameter, and
(c) a frequency of fluctuation in the measurement parameter is less than or equal to a preset frequency of fluctuation in the measurement parameter.

15. The first network controller according to claim 14, wherein if the processing unit determines that the measurement parameter of the terminal does not satisfy the access condition, the sending unit does not send the second signal to the terminal, so as to deny access of the terminal to the first network; or
if the processing unit determines that the measurement parameter of the terminal does not satisfy the access condition, the sending unit is configured to send a third signal to the terminal, so as to deny the access of the terminal to the first network.

16. The first network controller according to claim 14, wherein
the receiving unit is configured to obtain a load of the network access point of the first network, the processing unit is configured to set the access condition according to the load, and the first sending unit is configured to send the access condition to the network access point, so that the network access point compares the measurement parameter of the terminal with the access condition; or
the receiving unit is configured to obtain the load of the network access point of the first network, and the processing unit is configured to set the access condition according to the load, and compare the measurement parameter of the terminal with the access condition.

17. The first network controller according to claim 16, wherein:
the receiving unit is configured to receive the measurement parameter which is obtained by the network access point according to the first signal received from the terminal, and the processing unit is configured to compare the measurement parameter with the access condition; or
the receiving unit is configured to receive the first signal from the terminal, and the processing unit is configured to obtain the measurement parameter of the terminal according to the first signal, and compare the measurement parameter with the access condition.

18. The first network controller according to claim 16, wherein:
if the processing unit is configured to determine, by comparison, that the measurement parameter of the terminal satisfies the access condition, the processing unit instructs, according to load balancing of the first network, the sending unit to send the second signal to the terminal, so as to allow the terminal to access the first network;
wherein the load balancing comprises that the first network controller allows the terminal to access the first network through a network access point which has a minimum load among a plurality of network access points of the first network.

19. The first network controller according to claim 16, wherein the network access point comprises a first network access point and a second network access point, wherein:
the receiving unit is configured to receive a first access condition which is set by the first network access point according to a load of the first network access point, and a second access condition which is set by the second network access point according to a load of the second network access point, and the processing unit is configured to update the first access condition and the second access condition according to the load of the first network access point and the load of the second network access point; or
the receiving unit is configured to obtain the load of the first network access point and the load of the second network access point, the processing unit is configured to set the first access condition according to the load of the first network access point, and set the second access condition according to the load of the second network access point, and the processing unit is further configured to update the first access condition and the second access condition according to the load of the first network access point and the load of the second network access point.

20. The first network controller according to claim 16, wherein the first network and a second network have a topological relationship, the network device further comprises a second network controller, the receiving unit and the processing unit in the first network controller are a first receiving unit and a first processing unit, respectively, and the second network controller comprises a fifth receiving unit and a fifth processing unit, wherein:

the fifth receiving unit is configured to obtain the load of the second network, the first receiving unit is configured to obtain the load of the network access point of the first network, and the fifth processing unit is configured to update the access condition according to the topological relationship, the load of the second network, and the load of the network access point; or the first receiving unit is configured to obtain a load of the second network and the load of the network access point of the first network, and the first processing unit is configured to update the access condition according to the topological relationship, the load of the second network, and the load of the network access point.

* * * * *